United States Patent
Nikander

(10) Patent No.: US 8,428,005 B2
(45) Date of Patent: Apr. 23, 2013

(54) ROUTING IN A NETWORK

(75) Inventor: Pekka Nikander, Jorvas (FI)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 308 days.

(21) Appl. No.: 12/664,652

(22) PCT Filed: Jun. 14, 2007

(86) PCT No.: PCT/EP2007/055930
§ 371 (c)(1), (2), (4) Date: Mar. 26, 2010

(87) PCT Pub. No.: WO2008/151673
PCT Pub. Date: Dec. 18, 2008

(65) Prior Publication Data
US 2010/0183018 A1   Jul. 22, 2010

(51) Int. Cl.
*H04W 4/00* (2009.01)
(52) U.S. Cl.
USPC ............ 370/328; 370/338; 370/329; 370/331
(58) Field of Classification Search .................. 370/401, 370/352, 353, 331, 328, 338, 329, 330; 455/436, 455/435.1
See application file for complete search history.

(56) References Cited

U.S. PATENT DOCUMENTS

| | | | |
|---|---|---|---|
| 2008/0002599 A1* | 1/2008 | Yau et al. ....................... | 370/310 |
| 2008/0182576 A1* | 7/2008 | Tsirtsis et al. .............. | 455/435.1 |
| 2008/0205357 A1* | 8/2008 | Pandey et al. ................. | 370/338 |
| 2008/0207206 A1* | 8/2008 | Taniuchi et al. .............. | 455/436 |
| 2008/0285518 A1* | 11/2008 | Dutta et al. ..................... | 370/331 |
| 2008/0298303 A1* | 12/2008 | Tsirtsis ......................... | 370/328 |
| 2010/0177698 A1* | 7/2010 | Salmela et al. ............... | 370/328 |
| 2011/0149973 A1* | 6/2011 | Esteve Rothenberg et al. .......................... | 370/392 |
| 2012/0287934 A1* | 11/2012 | Sarela et al. .................. | 370/392 |
| 2012/0300781 A1* | 11/2012 | Sarela et al. .................. | 370/392 |

* cited by examiner

*Primary Examiner* — Chuong T Ho

(57) ABSTRACT

A network comprises a plurality of Access Routers arranged in one or more NetLMM domains. A domain comprises distributed routing information in the form of one or more Bloom filters or Bloom filter equivalents. In one embodiment, each Access Router may have an associated Local Bloom filter or Bloom filter equivalent that provides information as to which mobile nodes are currently behind the respective Access Router. Each Access Router sends its associated Local Bloom filter or Bloom filter equivalent to every other Access Router of the domain. An Access Router uses the Bloom filters or Bloom filter equivalents received from every other Access Router of the domain to determine to which Access Router to send a packet destined to a specified Mobile Node. Another embodiment uses partly-distributed routing information.

35 Claims, 6 Drawing Sheets

ROUTING IN A NETWORK

TECHNICAL FIELD

The invention relates to routing in a network, in particular a network to which a mobile node connects.

BACKGROUND

FIG. 1 is a schematic illustration of a network 1 that allows wireless communication with a mobile device 5. The mobile device may be, for example, a mobile telephone or a handheld wireless device such as a BlackBerry™ device and will be referred to generally as a "mobile node" (MN).

As is well known, a mobile node 5 may connect to the network 1 via one of a plurality of access points 4 ("AP"). Each access point has a defined area of geographic coverage and, as the mobile node 5 moves, it is "handed-off" from one access point to another when it passes from a geographic area served by one access point to the geographic area served by another access point. It is desirable that the user of the mobile node does not experience any breakdown or interruption in communication when the mobile node is handed-off from one access point to another.

Network-based Local Mobility Management (NetLMM) is an IETF endorsed approach to provide mobile nodes with an illusion of an extended layer 2 link. One specific solution to the NetLMM problem is currently being standardised in the NETLMM working group at the IETF. The basic architecture, as being worked on at the IETF, is presented in FIG. 1 and is described by H. Levkowetz, Editor, et al., in "The NetLMM Protocol", Internet draft draft-giaretta-netlmm-dt-protocol-02, work in progress, October 2006.

In the network of FIG. 1, a number of Access Routers (ARs) 3a,3b,3c, also called Mobile Access Gateways (MAG), participate in a NetLMM domain. The Access Routers of an NetLMM domain are associated with a Local Mobility Anchor 2a,2b; in the example of FIG. 1 the Access Routers 3a,3b participate in one NetLMM domain associated with one Local Mobility Anchor 2a, whereas the Access Router 3c participates in a different NetLMM domain associated with another Local Mobility Anchor 2b. The Access Routers in one NetLMM domain all announce the same IPv6 routing prefix in their Neighbour Discovery Protocol (NDP) Router Advertisement (RA) messages. This creates the illusion that the same IPv6 link is extended between these ARs, therefore avoiding the need for any explicit mobility signalling between the mobile node and the NetLMM domain as long as the mobile node remains in that NetLMM domain. In other words, the mobile node preserves its IP address as long as its mobility is confined within the NetLMM domain. In FIG. 1, a mobile node that moves between one Access Point controlled by an Access Router and another Access Point controlled by the same Access Router (denoted by "Intra-Link Mobility" in FIG. 1) or a mobile node that moves between one Access Point controlled by an Access Router and another Access Point controlled by another Access Router but associated with the same Local Mobility Anchor as the first Access Router (denoted by "Local Mobility" in FIG. 1) remains in one NetLMM domain. However, a Mobile Node that moves between one Access Point controlled by an Access Router associated with one Local Mobility Anchor to another Access Point controlled by an Access Router associated with another Local Mobility Anchor (denoted by "Global Mobility" in FIG. 1) moves from one NetLMM domain to another NetLMM domain.

SUMMARY

One aspect of the present invention provides a network comprising a plurality of Access Routers arranged in one or more NetLMM domains. The domain comprises distributed routing information stored in one or more Bloom filters or Bloom filter equivalents.

By "Bloom filter equivalent" is meant any data structure that may be used to test whether an element is a member of a set, and that is equally, or better, suited for a compact representation of set membership than a Bloom filter. For example, the invention may be alternatively effected using Approximate State Machines to store the routing information, rather than Bloom filters.

The routing information contains information as to which mobile nodes are currently behind which Access Routers of the domain, to allow a packet destined for a specified Mobile Node to be directed to the correct Access Router (ie, to the Access Router which the specified Mobile Node is currently behind). By "distributed" routing information is meant that the routing information is distributed over the Access Routers of a domain rather than being located in a central repository. Preferably, Access Routers of the domain maintain routing information for the Mobile Nodes currently associated with the domain.

The invention thus replaces the centralised NetLMM Local Mobility Anchor (LMA) point functionality of the network of FIG. 1 with a distributed routing structure, implemented jointly by the NetLMM Access Routers of a domain. This may provide better scalability. Moreover, elimination of the Local Mobility Anchor of FIG. 1 eliminates a potential single cause of network failure. The storage and communication overheads of this approach are made acceptable through the use of Bloom Filters.

Specifying that the network comprises a plurality of Access Routers arranged in one or more NetLMM domains is not intended to exclude the possibility that the network may include one or more further Access Routers that are not in the domain(s).

Preferably, the Access Routers are associated with a respective local Bloom filter or Bloom filter equivalent; the local Bloom filter or Bloom filter equivalent of an Access Router comprises information about the mobile nodes currently reachable from the Access Router.

The distributed routing information for a domain may be stored in respective Bloom filters or Bloom filter equivalents associated with the Access Routers arranged in a distributed architecture. In a fully-distributed architecture (for example FIG. 2), the routing information for a domain comprises respective Bloom filters or Bloom filter equivalents associated with each Access Routers of the domain. In a partially-distributed architecture, however, an Access Router having one or more hierarchical Access Routers dependent therefrom sends out a Bloom filter or Bloom filter equivalent that incorporates information about Mobile Nodes currently behind the hierarchical Access Routers.

One of the Access Routers may be adapted to update its respective Bloom filter or Bloom filter equivalent when there is a change in the Mobile Nodes currently being behind the Access Router.

The Access Routers may comprise a Host Identity Protocol proxy.

A domain may further comprise one or more hierarchical Access Routers associated hierarchically below one of the Access Routers. In this case, the Access Router having the hierarchically dependent Access Router(s) may be adapted to receive a respective Bloom filter or Bloom filter equivalent from each of its associated hierarchically dependent Access Routers, and to determine the union of the received Bloom filters(s) or Bloom filter equivalent(s) with its own Bloom filter or Bloom filter equivalent. It may be adapted to forward the union of the received Bloom filter(s) or Bloom filter equivalent(s) with its own Bloom filter or Bloom filter equivalent to other Access Routers of the domain.

The Bloom filters or Bloom filter equivalents may be counting Bloom filters.

A second aspect of the invention provides a method of providing routing information in an NetLMM domain comprising, at an Access Router of the domain, updating a first Bloom filter or Bloom filter equivalent containing information about Mobile Nodes currently being behind the Access Router as a consequence of a change in the Mobile Nodes being behind the Access Router. Information about the update of the first Bloom filter or Bloom filter equivalent is sent to at least one other Access Router of the domain.

An epidemic algorithm may be used to send information about the update of the first Bloom filter or Bloom filter equivalent to other Access Routers.

The change may be the arrival of a Mobile Node behind the Access Router. In this case, the method may comprise adding the identity of the Mobile Node to the first Bloom filter or Bloom filter equivalent of the Access Router. Information about the update of the first Bloom filter or Bloom filter equivalent may be addressed to an Access Router which the Mobile Node appears previously to have been behind.

Alternatively, the change may be the disappearance of a Mobile Node from behind the Access Router. In this case, the method may comprise removing the identity of the Mobile Node from the first Bloom filter or Bloom filter equivalent of the Access Router. Information about the update of the first Bloom filter or Bloom filter equivalent may be addressed to an Access Router which has recently sent information destined to the Mobile Node.

The method may further comprise the steps of (i) creating a first Bloom filter or Bloom filter equivalent containing information about Mobile Nodes currently being behind the Access Router and (ii) sending information about the created first Bloom filter or Bloom filter equivalent to at least one other Access Router of the domain.

Step (ii) may further comprise sending the first Bloom filter or Bloom filter equivalent obtained in step (i) to an Access Gateway of the domain.

The method may further comprise receiving, at the Access Router, information about a change in the Mobile Nodes being behind a third Access Router. A second Bloom filter or Bloom filter equivalent at the Access Router, which contains information about the Mobile Nodes currently being behind the third Access Router, is then updated.

The method may comprise maintaining, at the Access Router, a plurality of second Bloom filters or Bloom filter equivalents. Each second Bloom filter or Bloom filter equivalent contains information about the Mobile Nodes currently being behind a respective other Access Router.

The method may comprise maintaining, at the Access Router, a third Bloom filter or Bloom filter equivalent. The third Bloom filter or Bloom filter equivalent contains information about at least the origin of packets incoming at the Access Router.

An Access Router which the Mobile Node appears to have been behind may be identified from the second Bloom filter or Bloom filter equivalent.

An Access Router which has recently sent packets destined to the Mobile Node may be identified from the third Bloom filter or Bloom filter equivalent.

A third aspect of the invention provides a method of routing a packet, the method comprising the steps of: receiving, at an Access Router or Access Gateway of an NetLMM domain, a packet; and determining a destination for the packet from routing information being stored in one or more Bloom filters or Bloom filter equivalents.

The destination may be a mobile node accessible from another Access Router within the domain.

The step of determining a destination for the packet may comprise interrogating, at the Access Router, respective Bloom filters or Bloom filter equivalents received from other Access Routers of the domain.

The method may further comprise routing the packet to the destination determined from the routing information.

A fourth aspect of the invention provides an Access Router of an NetLMM domain. The Access Router comprises routing information stored in a first Bloom filter or Bloom filter equivalent. The first Bloom filter or Bloom filter equivalent contains information about the Mobile Nodes currently being behind the Access Router.

The Access Router may be adapted to update the first Bloom filter or Bloom filter equivalent as a consequence of a change in the routes to one of said Mobile Nodes being behind the Access Router, and to send information about the update of the first Bloom filter or Bloom filter equivalent to at least one other Access Router of the domain.

The Access Router may be adapted to, subsequent to the arrival of a Mobile Node behind the Access Router, to add the identity of the Mobile Node to the first Bloom filter or Bloom filter equivalent.

The Access Router may be adapted to, subsequent to the disappearance of a Mobile Node behind the Access Router, to remove the identity of the Mobile Node from the first Bloom filter or Bloom filter equivalent.

The Access Router may be adapted to send information about the update of the first Bloom filter or Bloom filter equivalent to other Access Routers of the domain using an epidemic algorithm.

The first Bloom filter or Bloom filter equivalent may be a counting Bloom filter or corresponding equivalent data structure.

The first Bloom filter or Bloom filter equivalent may be a union of a Bloom filter or Bloom filter equivalent containing information about the Mobile Nodes currently being directly behind the Access Router and a Bloom filter or Bloom filter equivalent containing information about the Mobile Nodes currently being behind another Access router that is associated hierarchically below the Access Router.

The Access Router may further comprise a second Bloom filter or Bloom filter equivalent. The second Bloom filter or Bloom filter equivalent contains information about the Mobile Nodes currently being behind another Access Router.

The Access Router may be adapted to receive information about updates to the second Bloom filter or Bloom filter equivalent from the another Access Router.

The Access Router may further comprise a third Bloom filter or Bloom filter equivalent. The third Bloom filter or Bloom filter equivalent contains at least information about the origin of incoming packets at the Access Router.

BRIEF DESCRIPTION OF THE DRAWINGS

Preferred embodiments of the present invention will now be described by way of illustrative examples, with reference to the accompanying figures, in which.

DETAILED DESCRIPTION

The invention will be described with reference to embodiments in which routing information is stored in Bloom filters. The invention is not however limited to the use of Bloom filters, and the invention may be effected by storing routing information in any data structure that is equally, or better, suited for a compact representation of set membership. For example, the invention may be alternatively effected using Approximate State Machines to store the routing information. Approximate State Machines are described by, for example, Bonomi et al., in "Beyond Bloom Filters: From Approximate Membership Checks to Approximate State Machines", in the Proceedings of ACM SIGCOMM 2006 conference.

Figure 1:
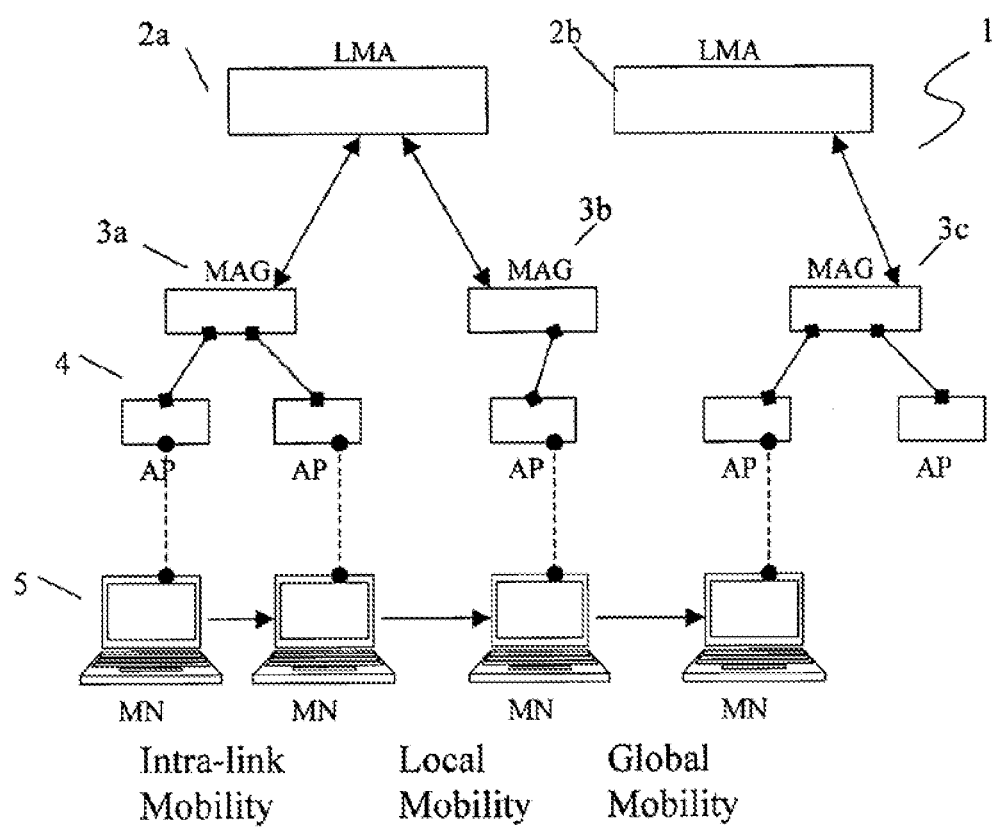
FIG. 1 is a block schematic diagram of a network architecture proposed by the IETF NETLMM working group.
Figure 2:
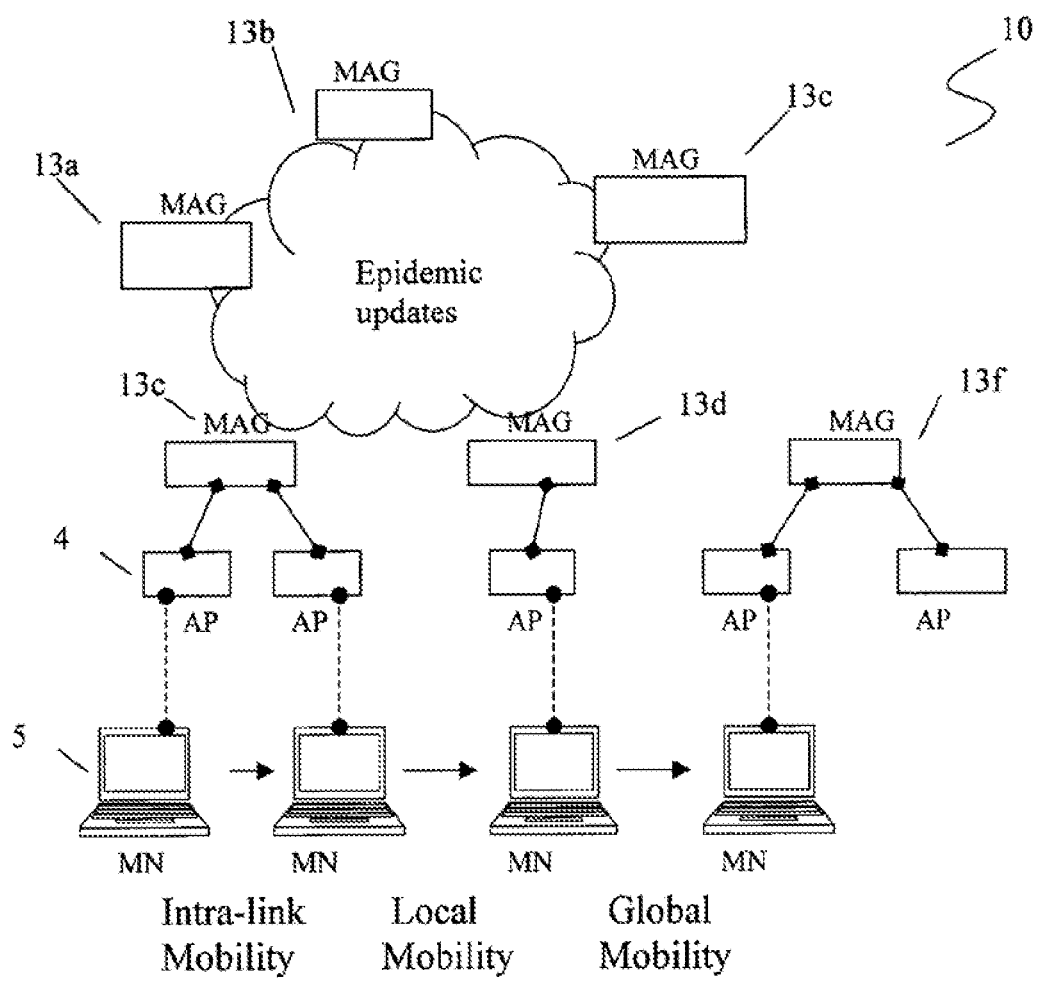
FIG. 2 is a block schematic diagram of a network architecture of the present invention.

FIG. 2 is a schematic block diagram showing a network 10 according to one embodiment of the present invention. In the network 10 of FIG. 2, Access Routers/Mobile Access Gateways 13a-13e belong to one NETLMM domain and Access Router/Mobile Access Gateway 13f belongs to another NETLMM domain (not shown in full in FIG. 2). Each Access Router has one or more associated Access Points (the Access Points associated with Access Routers 13a-13c have been omitted from FIG. 2 for clarity). The Access Routers of a domain have a distributed architecture, and the Local Mobility Anchor of FIG. 1 is not required.

The distributed architecture of FIG. 2 requires that routing information is distributed among each Access Router 13a-13e of an NetLMM domain to give a distributed routing structure, implemented jointly by the Access Routers of an NetLMM domain. According to the present invention the storage and communication overheads of this approach are made tolerable through the use of Bloom Filters to store routing information. Bloom filters are a storage-efficient way of representing set membership.

Initially, each Access Router in an NetLMM domain computes a Local Bloom filter which represents the set of mobile nodes currently behind it. It is preferable to use counting Bloom filters instead of plain Bloom filters, as this makes it easier to delete nodes from the Bloom filter of one Access Router when a mobile node leaves that Access Router. Then, the Local Bloom filter of each Access Router in the domain is distributed to all other Access Routers in the particular NetLMM domain, and is also distributed to any eventual Access Gateways towards the fixed part of the network or any external networks. The Bloom filters sent by an Access Router to the other Access Routers of the domain, and to Access Gateways of the domain, are referred to as "Outgoing Bloom filters" when received by the other Access Routers or any Access Gateway. The Outgoing Bloom filters are used to provide packet routing information in that domain. (It should be noted that Access Gateways do not create Local Bloom filters, as the mobile nodes cannot move to those parts of the network without losing their present NetLMM-based IP address. That is, mobility is confined to the set of Access Routers in an NetLMM domain, and the invention can thus provide intra-link or local mobility but not Global mobility.)

Figure 5:
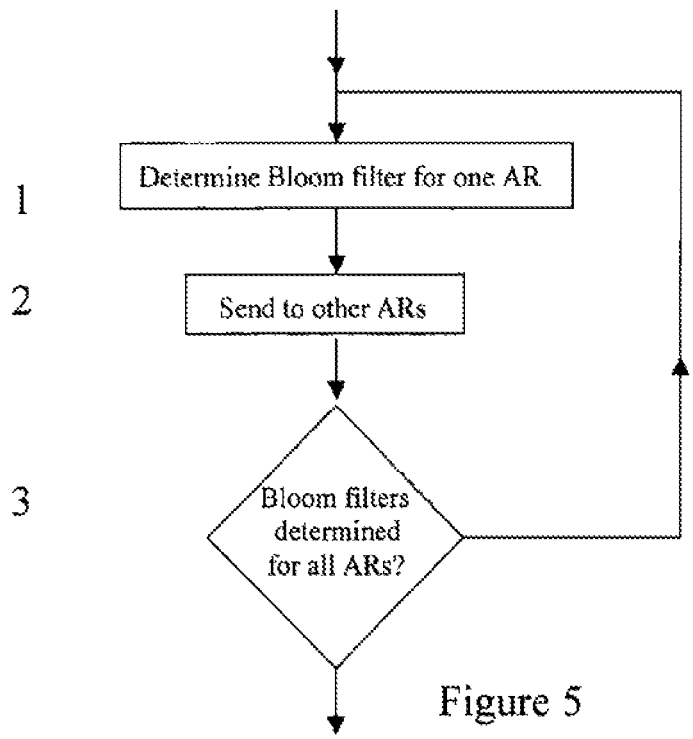
FIG. 5 is a schematic flow diagram of initiation of a routing method of the present invention.

This method is shown schematically in FIG. 5. Initially, at step 1, a Bloom filter is determined for one Access Router of a domain to represent the set of mobile nodes currently behind that Access Router. This Bloom filter is then sent to other Access Routers of the domain (and also to any Access Gateway of the domain) at step 2. There is then a determination, at step 3, whether a Bloom filter has been determined for all Access Routers of the domain for which Bloom filters are to be determined, and steps 1 and 2 are repeated until a "yes" determination is obtained at step 3.

The Outgoing Bloom filters for each Access Router in an NetLMM domain jointly form the routing table for that domain. When a packet destined for a specified Mobile Node is received at, for example, an Access Gateway of a domain, it is necessary to determine to which Access Router the packet should be sent. To do this, the Outgoing Bloom filters from all Access Routers of the domain are consulted (for example using an O(log n) algorithm), to determine which Access Router the specified Mobile Node is currently behind. The packet is then sent to that Access Router. (The notation "O(log n) algorithm" is a standard notation for algorithmic complexity measure. It basically means any algorithm that scales logarithmically, i.e., given that there are n elements that algorithm works upon, there is a need for O(log n) operations to run the algorithm, where O is a linear function.)

One advantage of the use of Bloom filters is that, with suitable hardware, it is possible to check a large number of Bloom filters in parallel (ie, simultaneously). It is preferable that the Outgoing Bloom filters of the Access Routers of the domain are consulted simultaneously, as this minimises the time required to determine the Access Router to which a packet should be sent.

It should be noted that one characteristic of a Bloom filter is that it may give false positives but does not give false negatives. That is, when the Outgoing Bloom filters from all Access Routers of a NetLMM domain are consulted to determine which Access Router of the domain a specified Mobile Node is currently behind, more than one match may be returned—that is, in addition to identifying the true Access Router of the domain that the specified Mobile Node is currently behind, one or more further Access Routers may falsely be identified as having the specified Mobile Node currently behind them. In this case, the packet is routed to each of the identified Access Routers only to be eventually dropped by any incorrectly identified Access Routers, which will notice that the received packet is destined to a Mobile Node that is not present at that Access Router.

Since a Bloom filter does not give false negatives, the list of Access Routers returned when the Outgoing Bloom filters are consulted must include the correct Access Router, i.e. must include the Access Router that the specified Mobile Node is currently behind.

Figure 6:
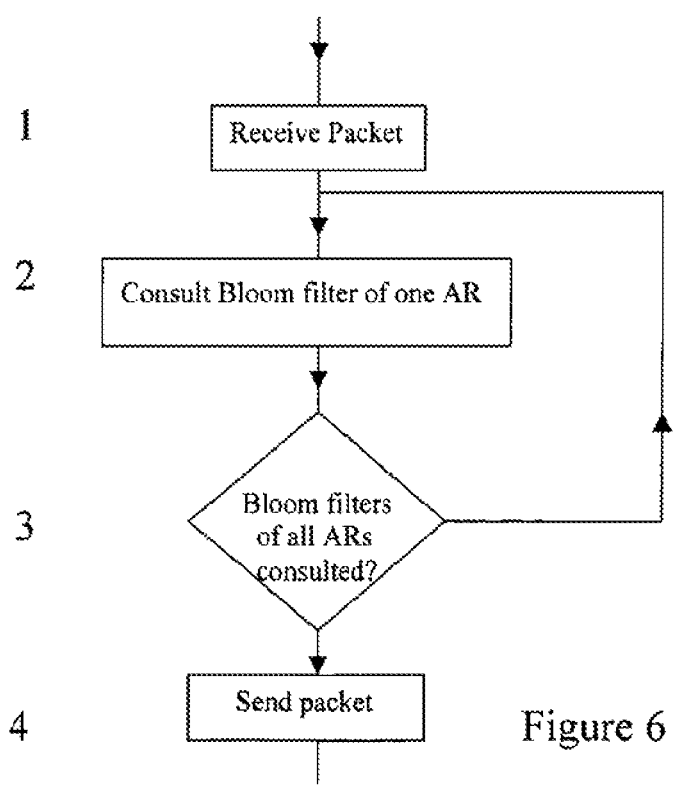
FIG. 6 is a schematic flow diagram of a method of generating routing information of the present invention.

The principal steps of this method are shown in FIG. 6. Initially, at step 1, a packet destined for a Mobile Node of a domain is received at an Access Router or Access Gateway of the domain. In this method, therefore, the Access Router or Access Gateway initially consults (step 2) the Outgoing Bloom filter received from one Access Router of the domain, to determine whether the Mobile Node is currently behind that Access Router. It is then checked (step 3) whether the Outgoing Bloom filter received from every Access Router of the domain has been consulted. If not all Bloom filters have been checked, step 2 is repeated for the Outgoing Bloom filter received from another Access Router of the domain and step 3 is again repeated. (A suitable counter may be used to keep track of which Bloom filters have been consulted, with the counter being incremented after each "no" determination at step 3.) Steps 2 and 3 are repeated until the Outgoing Bloom filter of every other Access Router in the domain has been consulted and a "yes" determination is obtained at step 3. The packet is then sent (step 4) to every Access Router that yields a "yes" determination at step 2.

Alternatively, the step of sending the packet may be carried out before step 3, so that a every time that a "yes" determination is obtained at step 2 the packet is sent to the Access Router having the Bloom filter that gave the "yes determination".

If every Bloom filter gives a "no" determination, this would indicate that the target Mobile Node is not behind any Access Router of the domain (for example if the Mobile Node has just left the domain). In this case the packet is simply dropped, as is known in IP networks.

If a packet is destined for a Mobile Node attached locally to an Access Router, the Access Router may route the packet using its incoming Bloom filter (to be defined below) or it could use other routing mechanisms to route the packet before consulting its Bloom filter. Use of the Access Router's incoming Bloom filter may be more resource-efficient.

Whenever a mobile node moves from one Access Router to another, the corresponding Bloom filters must be updated. This is described in detail below but, in brief, this is implemented by distributing the corresponding changes to the relevant Bloom filters among all the Access Routers in a domain. The principal steps are shown in FIG. 7.

Figure 7:
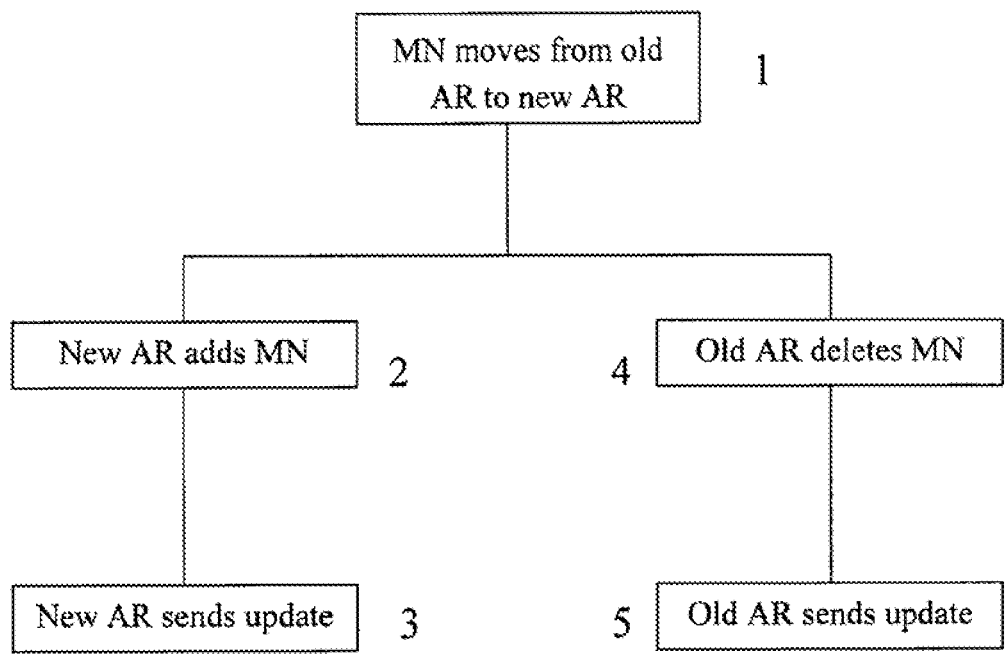
FIG. 7 is a schematic flow diagram showing the steps performed when a Mobile Node moves.

At step 1 of FIG. 7, a Mobile Node moves from one Access Router to another Access Router. At step 2 the "new" Access Router (ie, the Access Router to which the Mobile Node has moved) adds the identity of the Mobile Node to its Local Bloom filter, and at step 3 sends details of the corresponding change to all other Access Routers in the domain, and to any Access Gateway in the domain, causing them to update their respective Outgoing Bloom filters. Similarly, at step 4 the "old" Access Router (ie, the Access Router from which the Mobile Node has moved) deletes the identity of the mobile node from its Local Bloom filter and at step 5 sends details of the corresponding changes to other Access Routers in the domain (except that, in the case of a semi-distributed architecture as in FIG. 4, the "old" Access Router does not send details of the changes directly to Access Routers 13e, 13f that are hierarchically dependent from another Access Router), and to Access Gateways in the domain, causing them to update their respective Outgoing Bloom filters. (It would be possible to send the complete updated Bloom filter rather than details of the updates to the Bloom filter, but in practice this is likely to be undesirable owing to the amount of data that would need to be transferred.)

In FIG. 7 steps 2 and 3 are carried out at the "new" Access Router whereas steps 4 and 5 are carried out at the "old" Access Router. Steps 2 and 3 are therefore shown as occurring in parallel to steps 4 and 5 in FIG. 7, and the exact sequence in which steps 2 and 4, or steps 3 and 5, are carried out is not essential. It should be noted that it is initially sufficient for the new Access Router to send details of its updated Bloom filter to the other Access Routers and to any Access Gateway. Any delay in the old Access Router sending details of its updated Bloom filter to the other Access Routers and to any Access Gateway will simply mean that a packet will be sent to both the old and new Access Routers—as with the case of any false positives caused by the inherent false positives in the Bloom filters, any false positives due to delay in deleting a Mobile Node from the Local Bloom filter of an Access Router merely result in some packets being duplicated in the network, only to be eventually dropped by the Access Router that notices that the received packet is destined to a node that is no longer behind it. Accordingly, the corresponding additions and deletions can be distributed in a lazy, epidemic fashion. In a preferred embodiment, an epidemic gossiping algorithm, adopted from Alan Demers et al. "Epidemic algorithms for replicated database maintenance", 6th PODC, pages 1-12, New York, N.Y., 1987, and modified to adhere to the observed traffic patterns of the domain, thereby providing enhanced efficiency.

Compared to the current IETF NetLMM architecture of FIG. 1, the present invention provides the benefit that elimination of the Local Mobility Anchor means that there is no single point of failure in the network. The present invention also provides potentially better scalability than the hierarchical Access Routers of FIG. 1.

Figure 3:
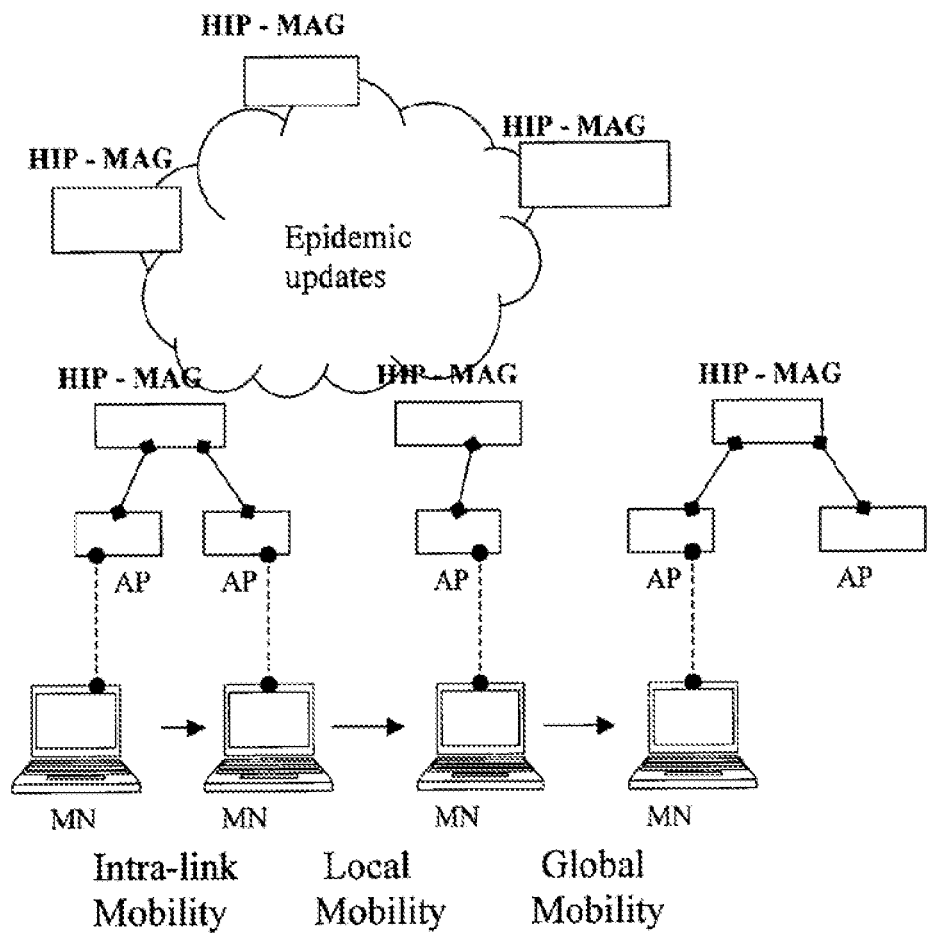
FIG. 3 is a block schematic diagram of a network architecture of the present invention.

Furthermore, the present invention may be applied together with the invention "Network-Based Local Mobility Management" described in co-pending application PCT/EP 2007/ . . . , with the same filing date as this application, Marks & Clerk reference P54283WO, in which the Access Routers of the network of FIG. 1 are provided with HIP (Host Identity Protocol) functionality. In brief, in a basic NetLMM solution the Access Routers/Mobile Access Gateways are assumed to be stationary. The co-pending invention allows them to be mobile, using HIP-based mobility, in the sense that they can be moved around with respect to the underlying IP infrastructure without these changes being visible to the NetLMM functionality. Hence, the co-pending invention allows supporting mobile sub-networks and other types of mobile routers. When the present invention is combined with the co-pending invention, the combination allows the mobile NetLMM access routers to be connected with each other without extra infrastructure. FIG. 3 is a block schematic diagram showing an embodiment in which the Access Routers of the embodiment of FIG. 2 are provided with HIP functionality.

Further details of the incorporation of HIP functionality are found in co-pending application PCT/EP 2007/ . . . , the contents of which are incorporated by reference.

Figure 4:
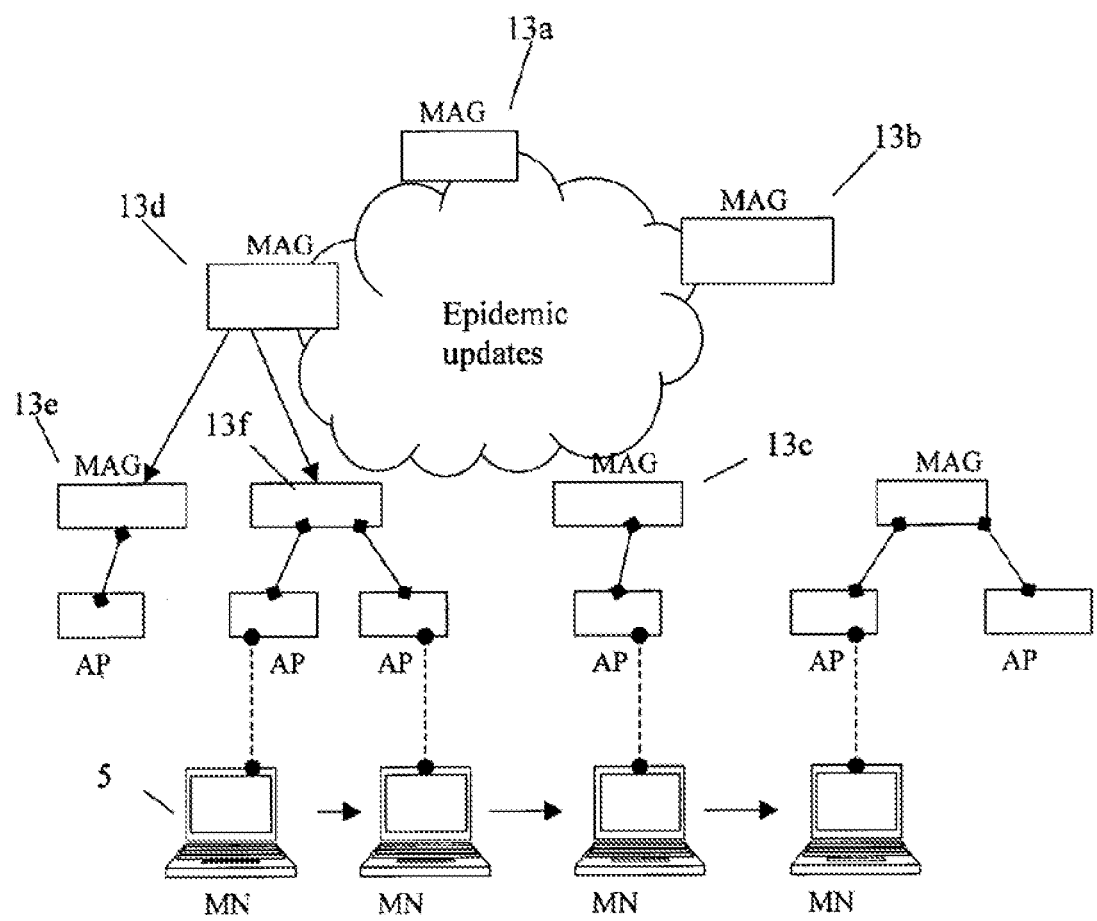
FIG. 4 is a block schematic diagram of a network architecture of the present invention.

In the embodiment of FIG. 2 the Access Routers have a fully distributed architecture. The invention is not however limited to this, and may also be applied to a partly-distributed architecture as shown in FIG. 4. In the partly-distributed architecture of FIG. 4, a single Access Router can represent a hierarchy of Access Routers by simply forming a union of the Local Bloom filters it receives from the Access Routers underneath it. It then distributes this union towards the other Access Routers, while itself keeping the received Local Bloom filters separate as its Outgoing Bloom Filters relating to the Access Routers underneath it, in order to be able to route any received packets correctly. In the example of FIG. 4, the Access Routers 13a-13d have a distributed architecture, as described above. Access Router 13d, however, represents a hierarchy of Access routers, here represented by two Access Routers 13e,13f. The Access Routers 13e,13f forward their local Bloom filters to Access Router 13d, which forms a union of the local Bloom filters of Access Routers 13e,13f and of its own Bloom filter, and forwards the union to the other Access Routers 13a-13c in the NetLMM domain and also to any Access Gateway (not shown) in the domain. When an incoming packet destined for a Mobile Node behind any of the Access Routers 13d,13e or 13f is received at, for example, Access Router 13a, Access Router 13a will consult its outgoing Bloom filter, determine that the packet should be sent to Access Router 13d, and then sends the packet to Access Router 13d.

Access Router 13d maintains the individual Outgoing Bloom filters for the Access Routers 13e,13f that are underneath it (ie, the local Bloom filters sent out by Access Routers 13e,13f) as well as its own local Bloom filter. Upon arrival of a packet at Access Router 13d, Access Router 13d consults the local Bloom filter and its Outgoing Bloom filters to determine whether the Mobile Node to which the packet is destined is behind Access Router 13d itself, is behind Access Router 13e, is behind Access Router 13f, or is behind any other Access Router, and routes the packet accordingly.

The embodiment of FIG. 4 may alternatively be implemented by providing the Access Routers 13a-13f with HIP functionality. In principle, it may also be possible to implement the embodiment of FIG. 4 by providing just the Access Routers 13a-13d having distributed architecture with HIP functionality.

Various features of the present invention will now be described in detail. Essentially, there are three main parts:
1. Maintaining the structure of the NetLMM domain, or knowledge of which Access Routers are participating in the domain.
2. Maintaining the location information about the mobile nodes.
3. The epidemic algorithm preferably used for updates in the data.

In the embodiment of FIG. 2, all Access Routers in a NetLMM domain need to maintain routing information of other Access Routers in the domain (although this is not true for the partly-distributed embodiment of FIG. 4). A single Access Router can be considered as the degenerate form of an NetLMM domain.

To join a new Access Router to an existing NetLMM domain, it needs to be assigned an identity. In a plain NetLMM network as in FIG. 2, this identity could be, for example, the static IP address of the new Access Router. In a HIP proxy based NetLMM network as in FIG. 3, on the other hand, the identity would be the HIP identity (public key) of the new Access Router.

To join the domain, the new Access Router needs to perform the following functions:
1. Learn the Bloom filters of all existing Access Routers in the domain. These can be learnt from any Access Router already in the domain.
2. Distribute its identity and its initial Local Bloom filter to all existing Access Routers in the domain, and to any Access Gateway in the domain. One way to accomplish this is to simply distribute the identity of the new Access Router, as the initial Bloom filter can be assumed to be empty. Alternatively, it may be unnecessary to distribute even the identity of the new Access Router, by allowing the identity to be established as a side effect of the new Access Router starting to push its local Bloom filter (see below).

In the partly-distributed embodiment of FIG. 4, when the Access Router 13f, for example, joins it would need to send its identity and Local Bloom filter only to the Access Router 13d, which would then update its Bloom filters (ie, add the received Bloom filter as a new Outgoing Bloom filter related to the Access Router 13f and update or renew the union Bloom filter) and send details of modifications to the previously sent out union of Bloom filter to the other Access Routers 13a-13c having distributed architecture in the domain (and to any Access gateway in the domain).

To remove an Access Router from a domain, the identity of the Access Router is deleted, and the corresponding Outgoing Bloom filters are removed from the other Access Router of the domain. One possible way of implementing this is to add a flag to the Bloom filter update protocol, stating that the Access Router in question is being deleted.

It is possible to merge two (or more) domains. In merging domains it is assumed that all Access Routers have distinct identities. Consequently, to join the domains it is sufficient to flood the network with the identities and Bloom filters of all Access Routers of the domain. While this can, in general, be implemented in the terms of the push algorithm to be described below, some care needs to be exercised in order not to temporarily overload the network.

To maintain and effectively distribute the information about at which Access Router a given Mobile Node is reachable at, each Access Router maintains the following data structures:

A Local Bloom filter representing the Mobile Nodes directly reachable from that Access Router (or, in the partly-distributed embodiment of FIG. 4, representing the Mobile Nodes directly reachable from that Access Router or from any dependent Access Routers). This filter is replicated at the other Access Routers to be used as the Outgoing Bloom filter related to this Access Router; see below. These filters are preferably counting Bloom filter in order to allow easy additions and deletions.

Outgoing Bloom filters, one per each Access Router. These filters are received from the other Access Routers, and collectively indicate, for traffic leaving the present Access Router, to which remote Access Routers an outgoing packets should be sent.

Incoming Bloom filters, one per each Access Router. These filters are kept locally and not distributed. They represent information about at least the originating Mobile Nodes of incoming traffic. They are used to make the epidemic gossip mongering algorithm more efficient. These filters are typically simple Bloom filters (not counting Bloom filters) and periodically replaced; several generations of them can be kept.

When a new Mobile Node arrives at a NetLMM domain, the following steps are needed:
1. The Mobile Node is assigned an identity using well-known IP means, for example using SEND and DAD as specified by J. Laganier, S. Narayanan, F. Templin, in "Network-based Localized Mobility Management Interface between Mobile Node and Access Router", Internet Draft draft-ietf-netlmm-mn-ar-if-01, work in progress, June 2006.
2. The new Mobile Node identity is added to the Local Bloom filter of the Access Router at which the Mobile Node has arrived.
3. The change to the Local Bloom Filter of the Access Router at which the Mobile Node has arrived is distributed to the other Access Routers, as explained below. The other Access Routers enter the data to their corresponding Outgoing Bloom filters.

When a Mobile Node moves from one Access Router, referred to as the "old Access Router", to another Access Router, referred to as the "new Access Router", the following steps are needed:
1. The new Access Router informs the old Access Router about the arrival of the Mobile Node. The new Access Router determines the old Access Router by consulting its Outgoing Bloom filters, i.e., by determining to which Access Router it would previously have sent packets destined for that Mobile Node before the Mobile Node had arrived at it. If there are several matches, it sends the update message to all matching Access Routers (see also the description of epidemic updates, below).

2. The new Access Router continues as in the case of a new Mobile Node, see above.

3. The old Access Router continues as in the case of a disappearing Mobile node, see below.

It is preferable that the information of the new location precedes the information about the disappearing location, so that there is always routing information for the Mobile Node present.

When an Access Router notes that a Mobile Node has disappeared, either by itself or as triggered by a change message sent by a new Access Router, it performs the following steps:

1. The Access Router makes sure that the MN is no longer directly reachable by, for example, standard IP means, as specified by J. Laganier, S. Narayanan, F. Templin, in "Network-based Localized Mobility Management Interface between Mobile Node and Access Router", Internet Draft draft-ietf-netlmm-mn-ar-if-01, work in progress, June 2006.

2. The Access Router removes the identity of the MN from its Local Bloom filter.

3. The change to the Bloom filter is distributed to the other Access Routers, for example as explained in the description of epidemic updates, below.

When the Local Bloom filter of an Access Router of an NetLMM domain changes, the changes are distributed to other Access Routers in the domain to allow them to update their Outgoing Bloom filters. In a preferred embodiment of the invention, the changes to the Local Bloom filters are distributed using the rumour mongering and anti-entropy algorithms proposed by Alan Demers et al. in "Epidemic algorithms for replicated database maintenance", 6th PODC, pages 1-12, New York, N.Y. (1987), with the following modifications:

1. In the case of in-moving or arriving nodes, the updates are first sent to the Access Routers where the node appears to have been, according to the Outgoing Bloom filters.

2. In the case of out-moving and disappearing nodes, the updates are first sent to the Access Routers or gateways from which there has been recent traffic to the given moving or disappearing node.

The Access Routers can easily keep track of where incoming traffic is coming from using their Incoming Bloom filters.

Once the updates have been first sent to the old locations and recent data sources, the rumour mongering and anti-entropy algorithms proposed by Demers et al. may then be are used as such.

The invention has been described above with reference to certain preferred embodiments. The invention is not however limited to these described embodiments and the invention may be varied from the described embodiments. The scope of protection is accordingly to be defined by the appended claims rather than by the preferred embodiments described above.

The invention claimed is:

1. A network comprising:
   a plurality of Access Routers arranged in one or more NetLMM (Network-based local Mobility Management) domains;
   wherein the domain comprises distributed routing information, the distributed routing information stored in one or more Bloom filters or Bloom filter equivalents; and
   wherein an Access Router:
   updates a first respective Bloom filter or Bloom filter equivalent containing information about Mobile Nodes being behind the Access Router; and
   maintains, in use, a second respective Bloom filter or Bloom filter equivalent containing information about the Mobile Nodes currently being behind another Access Router.

2. The network as claimed in claim 1 wherein the distributed routing information is stored in respective Bloom filters or Bloom filter equivalents associated with said Access Routers arranged in a distributed architecture.

3. The network as claimed in claim 1 wherein one of said Access Routers is adapted to update its first respective Bloom filter or Bloom filter equivalent when there is a change in the Mobile Nodes currently being behind the Access Router.

4. The network as claimed in claim 3 wherein said Access Router is further adapted to inform other Access Routers of the updating of its first respective Bloom filter or Bloom filter equivalent.

5. The network as claimed in claim 1 wherein said Access Routers comprises a Host Identity Protocol proxy.

6. The network as claimed in claim 1 wherein a domain further comprises one or more hierarchical Access Routers associated hierarchically below one of the Access Routers.

7. The network as claimed in claim 6 wherein the one of said Access Routers is adapted to receive a respective Bloom filter or Bloom filter equivalent from each of its associated hierarchical Access Routers, and to determine the union of the received Bloom filters(s) or Bloom filter equivalent(s) with its own Bloom filter or Bloom filter equivalent.

8. The network as claimed in claim 7 wherein the one of the distributed Access Routers is adapted to forward the union of the received Bloom filter(s) or Bloom filter equivalent(s) with its own Bloom filter or Bloom filter equivalent to other distributed Access Routers of the domain.

9. The network as claimed in Previously Presented claim 1 wherein the Bloom filters or Bloom filter equivalents are counting Bloom filters.

10. A method of providing routing information in an NetLMM (Network-based local Mobility Management) domain comprising the steps of:
   a) at first Access Router of the domain, updating a first Bloom filter or Bloom filter equivalent containing information about Mobile Nodes currently being behind the first Access Router as a consequence of a change in the Mobile Nodes being behind the first Access Router;
   b) sending information about the update of the first Bloom filter or Bloom filter equivalent to at least a second Access Router of the domain; and
   c) maintaining, at the first Access Router, a second Bloom filter or Bloom filter equivalent, the second Bloom filter or Bloom filter equivalent containing information about the Mobile Nodes currently being behind a third Access Router.

11. The method as claimed in claim 10 wherein step (b) comprises use of an epidemic algorithm to send information about the update of the first Bloom filter or Bloom filter equivalent to other Access Routers.

12. The method as claimed in claim 10 wherein the change is the arrival of a Mobile Node behind the first Access Router and step (a) comprises adding the identity of the Mobile Node to the first Bloom filter or Bloom filter equivalent of the first Access Router.

13. The method as claimed in claim 12 wherein step (b) comprises sending information about the update of the first Bloom filter or Bloom filter equivalent addressed to an Access Router which the Mobile Node appears to have been behind.

14. The method as claimed in claim 13, and comprising identifying an Access Router which the Mobile Node appears to have been behind from the second Bloom filter or Bloom filter equivalent.

15. The method as claimed in claim 10 wherein the change is the disappearance of a Mobile Node from behind the first Access Router and step (a) comprises removing the identity of the Mobile Node from the first Bloom filter or Bloom filter equivalent of the first Access Router.

16. The method as claimed in claim 15 wherein step (b) comprises sending information about the update of the first Bloom filter or Bloom filter equivalent addressed to an Access Router which has recently sent information destined to the Mobile Node.

17. The method as claimed in claim 10 and comprising the steps of:
before step (a), (i) creating a first Bloom filter or Bloom filter equivalent containing information about Mobile Nodes currently being behind the first Access Router and (ii) sending information about the created first Bloom filter or Bloom filter equivalent to at least one other Access Router of the domain.

18. The method as claimed in claim 17 wherein step (ii) further comprises sending the first Bloom filter obtained in step (i) to an Access Gateway of the domain.

19. The method as claimed in claim 18 and comprising maintaining, at the first Access Router, a plurality of second Bloom filters or Bloom filter equivalents, each second Bloom filter or Bloom filter equivalent containing information about the Mobile Nodes currently being behind a respective other Access Router.

20. The method as claimed in claim 10 and further comprising the steps of:
d) receiving, at the first Access Router, information about a change in the Mobile Nodes being behind the third Access Router; and
e) updating the second Bloom filter or Bloom filter equivalent at the first Access Router.

21. The method as claimed in claim 10 and comprising maintaining, at the Access Router, a third Bloom filter or Bloom filter equivalent containing information about at least the origin of packets incoming at the first Access Router.

22. The method as claimed in claim 21, and comprising identifying an Access Router which has recently sent packets destined to the Mobile Node from the third Bloom filter or Bloom filter equivalent.

23. A method of routing a packet, the method comprising the steps of:
maintaining, at an Access Router or Access Gateway of an NetLMM (Network-based local Mobility Management) domain, one or more Bloom filters or Bloom filter equivalents, a first one of the Bloom filter(s) or Bloom filter equivalent(s) containing information about the Mobile Nodes currently being behind other Access Router(s);
updating a second one of the Bloom filter(s) or Bloom filter equivalent(s) containing information about Mobile Nodes currently being behind the Access Router;
receiving, at the Access Router or Access Gateway, a packet; and
determining a destination for the packet from the information stored in the one or more Bloom filters or Bloom filter equivalents.

24. The method as claimed in claim 23 wherein the destination is a Mobile Node accessible from another Access Router within the domain.

25. The method as claimed in claim 23 wherein the Bloom filter(s) or Bloom filter equivalent(s) is/are received from other Access Routers of the domain.

26. The method as claimed in claim 23, and comprising routing the packet to the destination determined from the routing information.

27. An Access Router of an NetLMM (Network-based local Mobility Management) domain the Access Router comprising:
a first Bloom filter or Bloom filter equivalent for storing routing information, the first Bloom filter or Bloom filter equivalent containing information about Mobile Nodes currently being behind the Access Router;
wherein the Access Router further comprises a second Bloom filter or Bloom filter equivalent, the second Bloom filter or Bloom filter equivalent containing information about Mobile Nodes currently being behind another Access Router.

28. The Access Router as claimed in claim 27 and adapted to update the first Bloom filter or Bloom filter equivalent as a consequence of a change in the routes to one of said Mobile Nodes being behind the Access Router, and adapted to send information about the update of the Bloom filter or Bloom filter equivalent to at least one other Access Router of the domain.

29. The Access Router as claimed in claim 28 and adapted, subsequent to the disappearance of a Mobile Node behind the Access Router, to remove the identity of the Mobile Node from the first Bloom filter or Bloom filter equivalent.

30. The Access Router as claimed in claim 27 and adapted, subsequent to the arrival of a Mobile Node behind the Access Router, to add the identity of the Mobile Node to the first Bloom filter or Bloom filter equivalent.

31. The Access Router as claimed in claim 27 and adapted to send information about the update of the Bloom filter Or Bloom filter equivalent to other Access Routers of the domain using an epidemic algorithm.

32. The Access Router as claimed in claim 27 wherein the first Bloom filter or Bloom filter equivalent is a counting Bloom filter.

33. The Access Router as claimed in claim 27 wherein the first Bloom filter or Bloom filter equivalent is a union of a Bloom filter or Bloom filter equivalent containing information about the Mobile Nodes currently being directly behind the Access Router and a Bloom filter or Bloom filter equivalent containing information about the Mobile Nodes currently being behind another Access router that is associated hierarchically below the Access Router.

34. The Access Router as claimed in claim 27 and adapted to receive information about updates to the second Bloom filter or Bloom filter equivalent from the another Access Router.

35. The Access Router as claimed in claim 27 and comprising a third Bloom filter or Bloom filter equivalent containing at least information about the origin of incoming packets at the Access Router.

* * * * *

UNITED STATES PATENT AND TRADEMARK OFFICE
CERTIFICATE OF CORRECTION

PATENT NO. : 8,428,005 B2  
APPLICATION NO. : 12/664652  
DATED : April 23, 2013  
INVENTOR(S) : Nikander Page 1 of 1

It is certified that error appears in the above-identified patent and that said Letters Patent is hereby corrected as shown below:

In the Specification:

In Column 3, Line 3, delete "filters(s)" and insert -- filter(s) --, therefor.

In the Claims:

In Column 12, Line 27, in Claim 7, delete "filters(s)" and insert -- filter(s) --, therefor.

In Column 12, Line 35, in Claim 9, delete "Previously Presented claim 1" and insert -- claim 1 --, therefor.

Signed and Sealed this
Eighth Day of October, 2013

Teresa Stanek Rea
*Deputy Director of the United States Patent and Trademark Office*